(12) United States Patent
Becker

(10) Patent No.: US 6,217,049 B1
(45) Date of Patent: Apr. 17, 2001

(54) BICYCLE SUSPENSION SYSTEM WITH SPRING PRELOAD ADJUSTER AND HYDRAULIC LOCKOUT DEVICE

(75) Inventor: William M. Becker, San Carlos, CA (US)

(73) Assignee: RockShox, Inc., Colorado Springs, CO (US)

( * ) Notice: Subject to any disclaimer, the term of this patent is extended or adjusted under 35 U.S.C. 154(b) by 0 days.

(21) Appl. No.: 09/079,033

(22) Filed: May 14, 1998

Related U.S. Application Data

(60) Provisional application No. 60/051,719, filed on Jul. 3, 1997.

(51) Int. Cl.$^7$ .................................................. B62K 25/08
(52) U.S. Cl. ........................... 280/276; 188/313; 188/285
(58) Field of Search ..................................... 280/279, 275, 280/283, 276, 277; 188/313, 314, 315, 266.3, 266.4, 285

(56) References Cited

U.S. PATENT DOCUMENTS

| | | | | |
|---|---|---|---|---|
| 5,186,481 | * | 2/1993 | Turner | 280/276 |
| 5,193,833 | * | 3/1993 | Reisinger | 280/276 |
| 5,308,099 | * | 5/1994 | Browning | 280/276 |
| 5,829,773 | * | 11/1998 | Rajaee | 280/276 |

* cited by examiner

Primary Examiner—Kevin Hurley
(74) Attorney, Agent, or Firm—David W. Hansen

(57) ABSTRACT

A bicycle suspension fork for use on a bicycle, and preferably a road bicycle. The suspension fork has a preload adjuster that is designed and formed such that it is readily usable in the front fork of a bicycle without adding undue weight to the bicycle. The preload adjuster has interengaging preload elements that, instead of having a bulky adjustment mechanism typically provided for preload adjustment. Preferably, the preload elements have interengaging ribs and grooves, the relative position of which are adjustable to adjust preload on the suspension biasing element in the fork. Additionally, a lockout mechanism is provided for adjusting the compressibility of the suspension fork by rotating no more than about 60° during use of the bicycle. The lockout mechanism preferably has first and second fluid chambers in fluid communication and a fluid circulation control unit. Fluid flows between the chambers during compression and expansion of the suspension fork. The control unit controls fluid flow between the chambers and thus controls compressibility of the fork.

35 Claims, 4 Drawing Sheets

BICYCLE SUSPENSION SYSTEM WITH SPRING PRELOAD ADJUSTER AND HYDRAULIC LOCKOUT DEVICE

CROSS-REFERENCE TO RELATED PROVISIONAL APPLICATION

The present application claims the benefit of the earlier filing date of co-pending U.S. Provisional Patent Application Ser. No. 60/051,719, filed Jul. 3, 1997.

BACKGROUND OF THE INVENTION

The present invention relates to suspension systems having telescoping tubular elements and mechanisms for adjusting the relative telescopic movement of the tubular elements. More particularly, the present invention relates to compact, lightweight bicycle suspension systems having a spring preload adjuster, and/or a hydraulic lockout device that may be selectively, manually engaged to substantially prevent operation of the suspension system.

Vehicles, and bicycles in particular, have been provided with suspension systems for cushioning impacts or vibrations experienced by the rider when the vehicle contacts bumps, ruts, rocks, pot holes, or other obstacles in the path along which the vehicle is being ridden. Typically, bicycle suspension systems have been configured for use in the front or rear bicycle fork, in the head tube that connects the front fork to the bicycle frame and handlebars, in the seat post, and in conjunction with a rear wheel swing-arm assembly, as well as in other locations. When configured for use in a front fork, the suspension system has two pairs of telescoping tubular elements (an inner tubular element and an outer tubular element) forming the left and right legs of the fork. A resilient biasing element, such as a spring, biases the tubular elements apart. The tubular elements are said to undergo a compression stroke when the elements telescope together (the inner element slides into the outer element), such as upon impact to the fork. The tubular elements are said to undergo an expansion stroke (or rebound stroke) when the elements telescope apart (the inner element slides out from the outer element), such as after a compression stroke or upon riding over a rut. The biasing element absorbs energy imparted to the fork during compression, and releases the stored energy during rebound of the fork.

Various features have been added to such suspension systems in order to suit the needs of a variety of users. One such feature is the ability to adjust the preload on the biasing element in the bicycle suspension fork. Among other things, the preload on the compression spring determines the "sag" for the fork, that is, how much the fork initially compresses when a rider sits on the bicycle. If the fork does not sag at all, the fork will be inadequately responsive to variations in road conditions. For example, if the fork has no sag, it cannot expand to meet the road when the bicycle rides over a rut or other depression in the rider's path. On the other hand, if too much sag is present in the fork, the fork may bottom-out too easily (i.e., the inner tubular element may move excessively into the outer tubular element, resulting in collision of the elements).

Although bicycle suspension systems have generally experienced considerable commercial success in connection with bicycles designed for predominantly off-road use, such as bicycles known as "mountain bikes," such systems have not experienced the same success in connection with bicycles not intended for off-road use, such as bicycles known as "road bikes." One common reason is that suspension systems add weight to road bikes which is particularly undesirable given the high desire for lightweight bicycles for long biking excursions for which road bikes are often used. However, the benefits suspension systems confer on mountain bikes would nonetheless also be desirable for road bikes.

Due to the nature of their use, road bikes typically do not experience the same variety of obstacles or harshness of impacts as typically experienced by mountain bikes. Unlike the typical mountain bike, however, the typical road bike has thin, high profile tires that provide little impact absorption. Thus, impacts that would be virtually unnoticed by a mountain bike rider may cause discomfort to road bikers. Indeed, during long-distance riding, such as commonly done with road bikes, irregularities in the rider's path and vibrations caused from such irregularities will likely disturb and fatigue the road bike rider. Such fatigue may effect the rider long before the rider would otherwise be fatigued from the mere exertion necessary for simple riding of the bicycle over the long distance.

Several problems are inherent in designing suspension systems for bicycles such as road bikes. For example, because weight is of critical concern to road bike riders, and particularly to road bike racers, a suspension system must be lightweight, while still providing adequate adjustment capabilities. In addition, the system must be compact so that it may be aerodynamically packaged in the bicycle, and its adjustment mechanisms must be easy to use. Because bicycle weight is a central concern to bicycle riders, particularly road bike riders and racers, any preload adjustment mechanism should also be as lightweight as possible. Of course, it is also desirable that the adjustment mechanism be easy to manufacture and easy to use.

Another crucial consideration for road bikers is conservation of energy. When a rider is sprinting or climbing, for example, the rider will often lift himself or herself out of the bike seat while pedaling, causing the road bike suspension system to oscillate. The suspension system thereby absorbs a portion of the rider's power output, a result which is highly undesirable.

SUMMARY OF THE INVENTION

It is therefore an object of the present invention to provide a suspension system that may be used in many suspension systems, but that is sufficiently aerodynamic and lightweight to be used on a road bike.

It is a related object of the present invention to provide a preload adjuster for a lightweight, aerodynamic bicycle suspension system to be used to adjust the preload of the bicycle suspension system.

It is a further object of the present invention to provide a mechanism that permits adjustability of the amount of energy that may be absorbed by a suspension fork for a given use such that the fork may be converted from a suspension fork to a substantially rigid fork.

These and other objects are accomplished in accordance with the principles of the present invention by providing a suspension system that is compact and lightweight and which has the ability to eliminates undesirable oscillations when used in a suspension system such as a fork of a road bike. The suspension system includes a preload adjuster that is compact, yet permits adjustment of the preload of the system as desired by the user. Additionally, the suspension system includes a lockout mechanism that permits the system to be converted from an energy absorbing suspension system to a substantially rigid system. Although the suspension system of the present invention may be used on any type of bicycle, or in any suspension system for vehicles or machines, it is ideally suited for use with road bikes and is particularly suited to be disposed in a road bike fork.

The above and other objects, features, and advantages of the present invention will be readily apparent from the following detailed description of the invention taken in conjunction with the accompanying drawings wherein like reference characters represent like elements, the scope of the invention being set out in the appended claims.

DETAILED DESCRIPTION OF THE INVENTION

Figure 1:
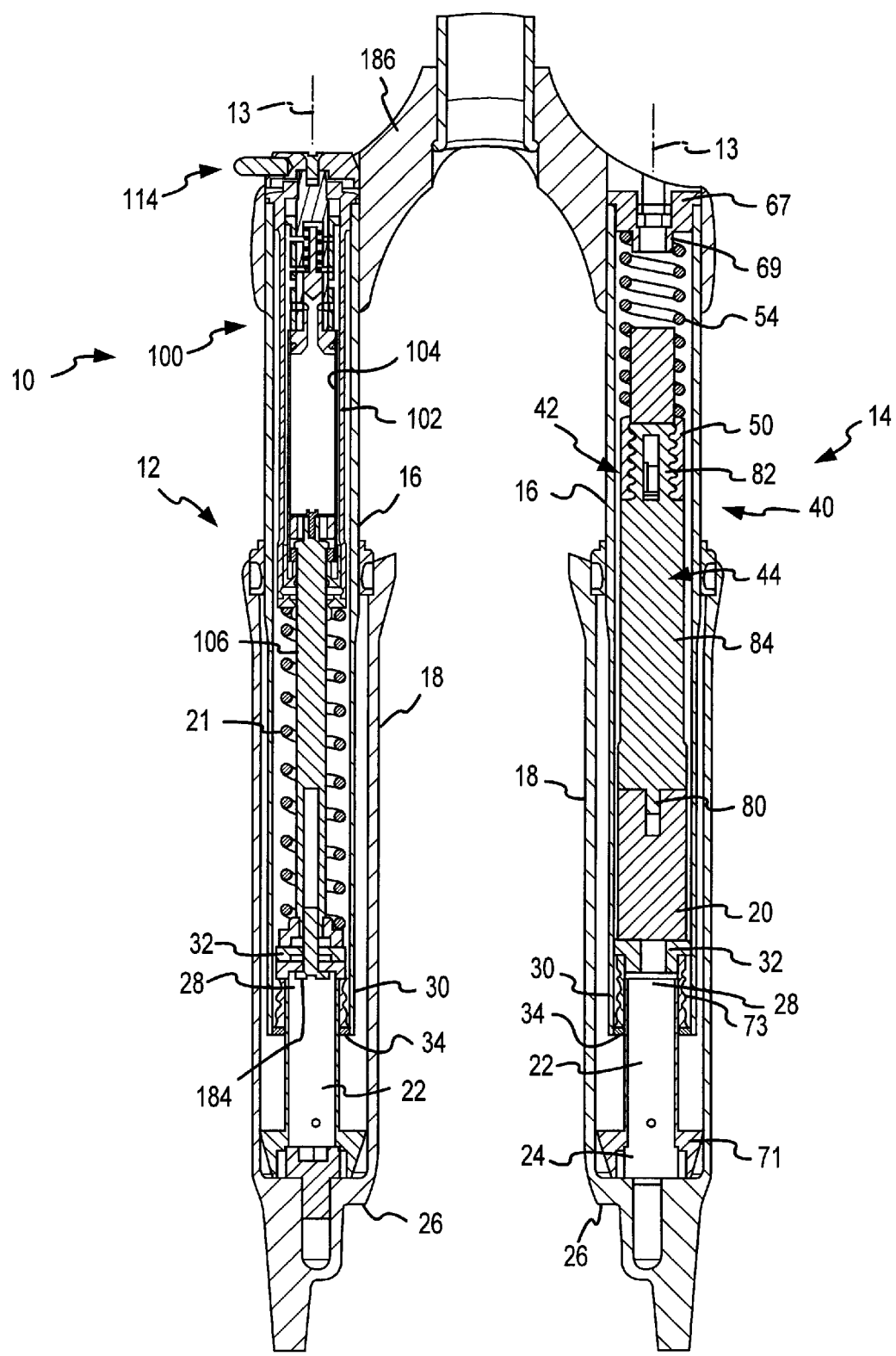
FIG. 1 is a cross-sectional view of a front bicycle suspension fork having a spring preload adjuster formed in accordance with the principles of the present invention in a first fork leg and a hydraulic lockout device formed in accordance with the principles of the present invention in a second fork leg.

FIG. 1 illustrates an exemplary application of the principles of the present invention in a front bicycle suspension fork 10. As shown in FIG. 1, in the preferred embodiment of the present invention, a bicycle fork 10 comprises first 12 and second 14 fork legs, each leg being comprised of a pair of telescoping fork tubes. Each pair of tubes includes an inner tube 16 which extends into an outer tube 18 having a common longitudinal axis 13. Although the inner tube 16 is typically the upper tube, as shown, the reverse may be true (i.e., the inner tube 16 may be the lower tube). Typically, the tubes 16,18 of the telescoping fork tubes 12, 14 are biased apart by one or more biasing elements 20, 21, and 54, such as elastomer members or coil springs, which are typically arranged within the inner tube 16.

Preferably, when the fork is positioned for use on a bicycle, the inner tube 16 is upwardly biased from the outer tube 18. A plunger rod 22 is connected at a first end 24 to a lower portion 26 of outer tube 18, and extends axially (along axis 13) within outer tube 18. Plunger rod 22 has a second end 28 that extends through a lower end 30 of upper tube 16, and has an end plate 32 coupled thereto. Lower end 30 of inner tube 16 preferably has a flange 34 that prevents plunger rod end 28, along with end plate 32, from passing through the lower end 30 of inner tube 16. Thus, plunger rod 22 prevents inner and outer tubes 16, 18 from disengaging.

As shown in FIG. 1, the bicycle suspension system of the preferred embodiment of the present invention comprises a preload adjuster 40 disposed in one leg 14 of the bicycle fork, and a hydraulic lockout device 100 in the other leg 12 of the fork. Preferably, as in FIG. 1, both preload adjuster 40 and hydraulic lockout device 100 are disposed in the inner tube 16 of their respective fork legs. However, it will be appreciated that legs 14, 12 of fork 10 may contain preload adjuster and hydraulic lockout in their respective outer tubes 18, instead.

The preferred embodiment of the preload adjuster 40 of the present invention is made up of only two parts to effect adjustment of a suspension system's spring preload, the minimum number of parts required for a preload adjustment design. In addition, these parts may be made from lightweight material such as plastic, which is preferably injection-molded.

Figure 2:
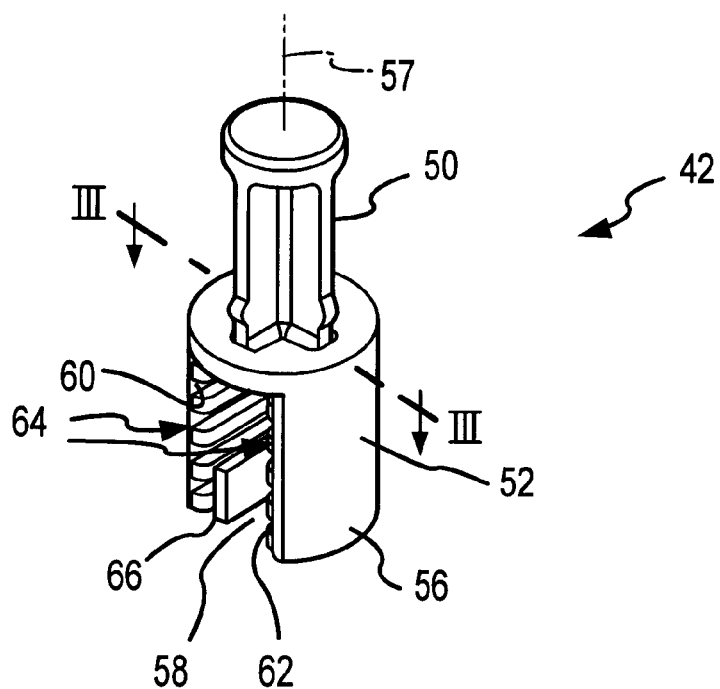
FIG. 2 is an isolated perspective view of the preload adjuster of FIG. 1.

Specifically, as illustrated in the bicycle suspension fork 10 of FIG. 1, the preferred embodiment of the preload adjuster 40 of the present invention includes a preloader 42 and a spacer 44. Preloader 42 and spacer 44 are each preferably aligned with longitudinal axis 13 of the tubes 16, 18 in which they are positioned. Preloader 42, shown in FIGS. 1–3 comprises a spring attachment portion 50 and an adjustment portion 52, as can be seen in FIG. 2. As illustrated in FIG. 1, spring attachment portion 50 is configured to retain and position one or more biasing elements, such as coil spring 54, within fork leg 14. It will be understood that a different type of biasing element other than coil spring 54, or one or more such biasing elements in addition to coil spring 54, may be used to serve the same purpose.

Figure 3:
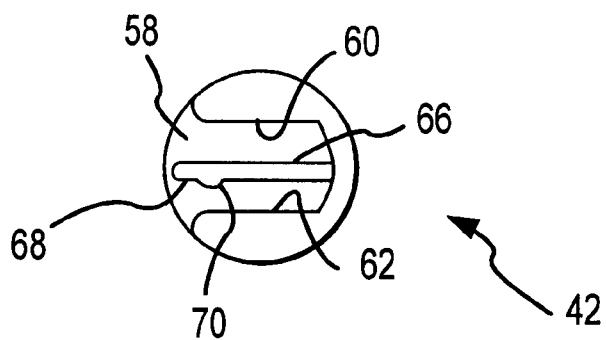
FIG. 3 is a cross-sectional view of the preloader of the preload adjuster of FIG. 2, taken along line III—III of FIG. 2.

Adjustment portion 52 comprises a preferably substantially cylindrical receiving body 56 with a substantially rectangular slot 58 extending through one side of body 56 and centered about longitudinal axis 57 of body 56, as can be seen in FIGS. 2 and 3. Referring to FIGS. 2 and 3, slot 58 has a first side 60 and a second side 62, each side 60, 62 having a plurality of laterally extending grooves 64. A locking tab 66 having a ramp portion 68 and a flange 70 extends substantially parallel to and between first and second sides 60, 62 of slot 58.

Figure 4:
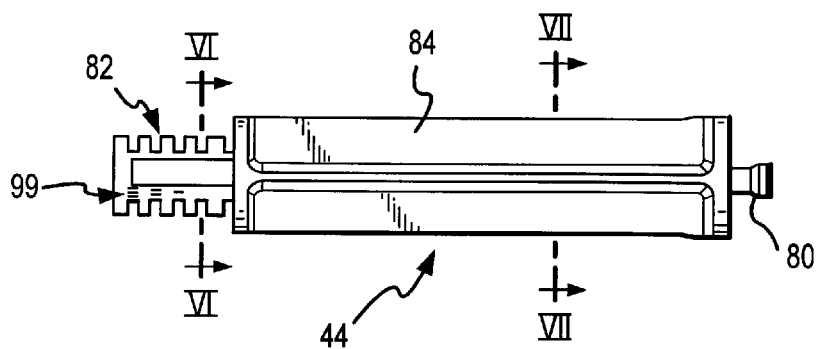
FIG. 4 is an isolated elevational view of the spacer of the preload adjuster of the preload adjuster of FIG. 1.
Figure 5:
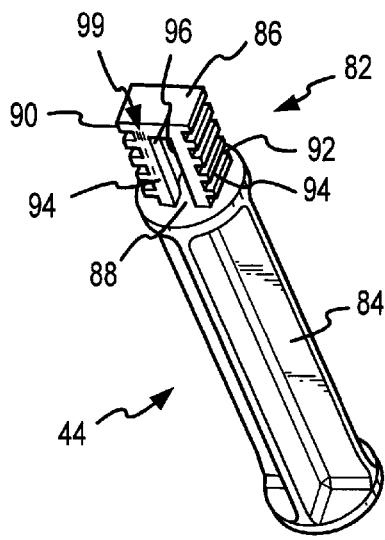
FIG. 5 is a perspective view of the spacer of FIG. 4.

Spacer 44, as illustrated in FIGS. 4 and 5, comprises a spring attachment portion 80 and an adjustment portion 82 with an elongated mid-portion 84 therebetween. Spring attachment portion 80, as can be seen in FIGS. 1 and 4 is configured to retain and position one or more biasing elements 20, such as elastomer springs within fork leg 14. For example, FIG. 1 illustrates spring attachment portion 80 of spacer 44 interconnected with a single microcellular urethane spring 20. It will be understood that a different type of biasing element other than an elastomer spring may be used, spring attachment portion 80 being appropriately configured for such biasing element.

Figures 6, 7:
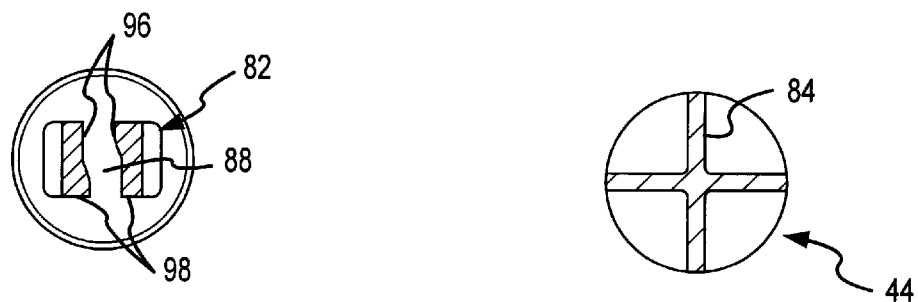
FIG. 6 is a cross-sectional view of the spacer of FIG. 4, taken along line VI—VI of FIG. 4.
FIG. 7 is a cross-sectional view of the spacer of FIG. 4, taken along line VII—VII of FIG. 7.

Referring to FIGS. 4 and 5, adjustment portion 82 is formed as a rectangular body 86 extending upwardly from mid-portion 84 and having a lateral slot 88 through its mid-section. The rectangular body 86 of adjustment portion 82 has a first side 90 and a second side 92, each side having a plurality of laterally extending ribs 94. The non-solid, substantially rectangular cross-section of adjustment portion 82 of spacer 52 provides a structure that is both rigid and lightweight. The lateral slot 88 of the adjustment portion 82 of spacer 44 has inner walls 96. As illustrated in FIG. 6, an outer ledge portion 98 formed by the rectangular body 86, surrounds the entrance to slot 88.

The adjustment portion 82 of spacer 44 is sized and shaped to closely and matingly engage the adjustment portion 52 of preloader 42 by relative movement of preloader 42 and spacer 44 in a direction substantially perpendicular to longitudinal axis 13. Such adjustment permits the elimination of bulky adjusters of the prior art, such as knobs that rotate preload elements relative to each other to modify the preload exerted thereby. In the preferred embodiment, lateral ribs 94 of the adjustment portion 82 of spacer 44 are inserted into lateral grooves 64 of adjustment portion 52 of preloader 42 by such relative movement of preloader 42 and spacer 44 substantially perpendicular to axis 13. As lateral ribs 94 are inserted into lateral grooves 64, the ramp portion 68 of the preloader locking tab 66 engages the inner walls 96 of slot 88 of adjustment portion 82 of spacer 44, and the locking tab 66 is progressively deflected until the insertable adjustment portion 82 of spacer 44 is fully inserted into the receiving adjustment portion 52 of preloader 42. At that point, the locking tab 66 deflects and locking tab flange 70 engages outer ledge portion 98 to snap) preloader 42 and spacer 44 together and ensure that preloader 42 and spacer will not accidentally disengage.

As shown in FIG. 4, the elongated mid-portion 84 of spacer 44 couples adjustment portion 82 and spring attachment portion 80. Preferably, spacer 44 is formed as a single piece with mid-portion 84, adjustment portion 82, and spring attachment portion 80. As illustrated in FIG. 7, the cross-section of mid-portion 84 of spacer 44 preferably is "+"-shaped, providing enhanced rigidity for resisting buckling during the application of loads thereto. It will be understood that obvious variants having a different cross-sectional shape that provides similar structural rigidity may be used instead.

As a result of the rib-and-groove structure of the preferred embodiment of the present invention, the longitudinal position of preloader 42 in fork leg 14 may be adjusted relative to spacer 44, thereby modifying the combined length of preloader 42 and spacer 44 in distinct increments. Modification of the combined length of preloader 42 and spacer 44 thereby increasing or decreasing the preload on the coil spring 54 engaged with preloader 42, or on the elastomer spring 20 engaged with spacer 44, or on both. In addition, ribs 94 of spacer 44 and grooves 64 of preloader 42 each are symmetrical, such that if spacer 44 is rotated about its longitudinal axis 180 degrees relative to preloader 42, ribs 94 of spacer 44 and grooves 64 of preloader 42 will still interengage properly, and locking tab 66 of preloader 42 will snap spacer 44 in place. This makes preload adjuster 40 of the present invention easy for any rider to use.

In a preferred embodiment, the number of ribs 94 of the adjustment portion 82 of spacer 44 and the number of grooves 64 of the adjustment portion 52 of preloader 42 are sufficient to permit two or more, and preferably at least three, potential distinct adjustment positions, as evidenced by the "I," "II," and "III" adjustment position designations 99 shown in FIGS. 4 and 5. Preferably, this permits a selection of approximately 3 mm, 7 mm, or 11 mm preload, respectively, or other desired preload values as would be desirable by the user.

Preload adjuster 40 of the present invention preferably also includes a preload limit feature. Specifically, the size and position of locking tab 66 in preloader 42 and the size of slot 88 in spacer 44 in which tab 66 is inserted are configured such that preloader 42 and spacer 44 cannot be assembled such that a structurally insufficient or dangerous number of ribs 94 and grooves 64 are engaged. In other words, each of the positions in which locking tab 66 will fit into slot 88 in spacer 44 provides a structurally sound preloader-spacer structure.

In operation, when inner tube 16 and outer tube 18 slide together and fork 10 compresses, coil spring 54 and elastomer spring 20 may compress between end plate 32 and an end cap 67. A spring adapter portion 69 of end cap 67 is configured to couple to coil spring 54, and spring attachment portion 80 of spacer 44 is configured to couple to elastomer spring 20, so that coil spring 54, preloader 42, spacer 44 and elastomer spring 20 may be drawn out of inner tube 16 as a single spring stack unit. Accordingly, these parts may be accessed for adjusting the preload of fork 10, or the spring rate of the springs 54 and 20 used within fork 10, by removing end cap 67.

The preload adjuster 40 of the present invention is particularly ideal for use in the fork of a road bike. Specifically, due to aerodynamic considerations, the fork tubes of road bike forks are typically too narrow to accommodate a knob and accompanying adjustment structure for adjusting the preload of the suspension spring stack within the respective fork tube, as is commonly provided in preload adjusters of mountain bikes. The preferred embodiment of the present invention, which as described above provides for internal preload adjustment, addresses this concern, and also provides a lighter weight structure than would be provided by a preload adjuster utilizing an adjuster knob and accompanying adjustment structure on the fork tube.

For additional adjustment of the spring stack, various coil springs and elastomer springs having varying springs rates may be used with the preloader 42 and spacer 44 of the present invention, in order to change the preload or the compression spring characteristics.

In addition to permitting preload adjustment, suspension fork 10 of the present invention also permits the user to selectively turn on or off the suspension capabilities of fork 10 by providing a lockout device 100. A preferred embodiment of a hydraulic lockout device 100 formed in accordance with the principles of the present invention is illustrated in suspension fork 10 of FIG. 1. Because each of preload adjuster 40 and hydraulic lockout device 100 of the present invention is preferably used in only one of fork legs 12, 14, if preload adjuster 40 is provided in fork leg 14, then hydraulic lockout device 100 is preferably provided in fork leg 12. Most preferably, hydraulic lockout device 100 is positioned between inner tube 16 and plunger end plate 32.

Figure 8:
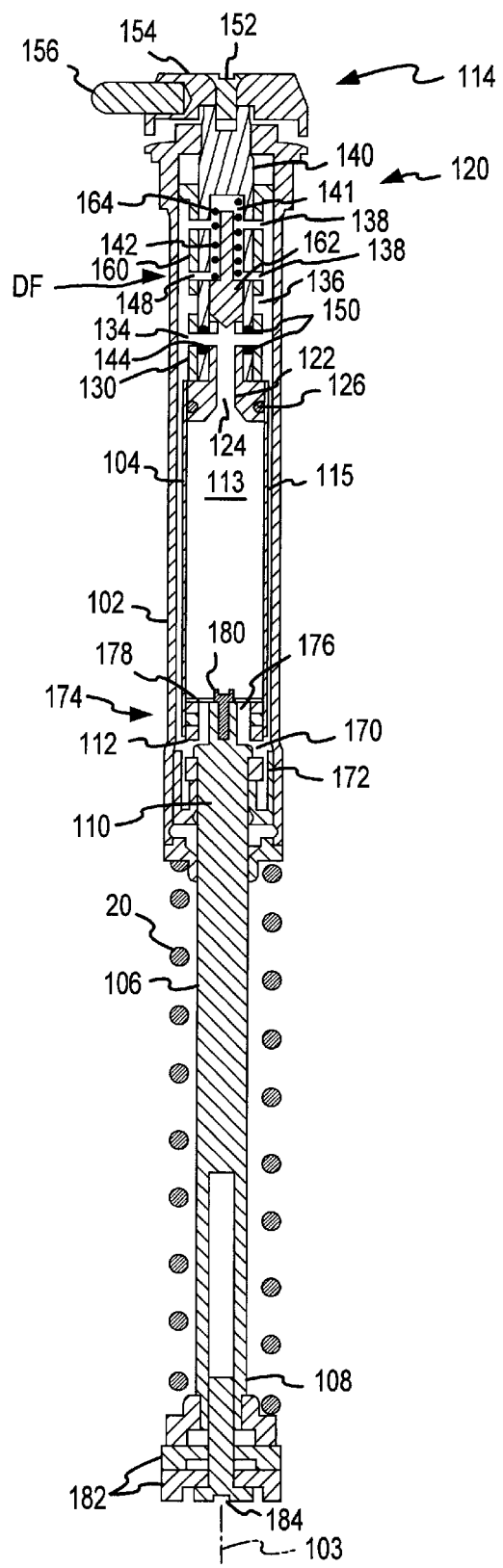
FIG. 8 is an isolated cross-sectional view of the hydraulic lockout device of FIG. 1 in the off position.

As shown in FIG. 8, a preferred embodiment of lockout device 100 comprises a substantially cylindrical hollow outer lockout sleeve 102, a substantially cylindrical hollow inner lockout sleeve 104 concentrically positioned within outer lockout sleeve 102, and a shaft 106 which telescopingly extends into lockout sleeves 102, 104, along longitudinal axis 103 of sleeves 102, 104. Lockout sleeves 102, 104 are preferably concentrically positioned within inner tube 16, as shown in FIG. 1. Shaft 106 has first and second ends 108, 110 and a piston 112 secured to the second end 110. The first end 108 of shaft 106 is coupled to plunger rod 22 and outer tube 18, as shown in FIG. 1 and as will be described in further detail below. The chamber 113 within inner lockout sleeve 104 and the substantially annular chamber 115 between outer lockout sleeve 102 and inner lockout sleeve 104 are preferably filled with a fluid such as a common industrial hydraulic oil, but may be filled with any preferably incompressible fluid such as glycerine, fish oil, or water. When fork 10 is in its normal upright position with outer lockout sleeve 102 and shaft 106 in a spaced-apart relationship(as shown in FIGS. 1 and 8), the fluid preferably rises approximately to the position indicated by "DF" in FIG. 8. An actuator 114 is provided to permit selection between at least an "off" position in which fluid flows between chambers 113 and 115 and in which fork 10 acts like a suspension fork, and an "on" position in which fluid is substantially inhibited from flowing between chambers 113 and 115 and in which fork 10 acts substantially like a rigid fork, as will now be described.

When actuator 114 is in the "off" position, when the bicycle is ridden over an obstacle that should typically cause the fork to compress, inner tube 16 telescopes into outer tube 18 and shaft 106 and piston 112 move further into inner lockout sleeve 104. Lockout device 100 is provided with a fluid flow path that permits fluid in lockout sleeves 102, 104 to circulate and thus permit shaft 106 and piston 112 to move into inner lockout sleeve 104. In particular, fluid flows between chamber 113 (in inner lockout sleeve 104) and annular chamber 115 (between inner lockout sleeve 104 and outer lockout sleeve 102). A fluid circulation control unit 120 is provided for control by actuator 114. Circulation control unit 120 includes a substantially hollow mounting element 122 coupled to inner lockout sleeve 104 such that the flow passage 124 therein is in fluid communication with the interior of inner lockout sleeve 104. Preferably, an o-ring 126 is used to seal the connection between mounting element 122 and inner lockout sleeve 104. A substantially hollow blow-off sleeve 130, having at least one and preferably a plurality of circulation ports 134, blow-off ports 136, and drain ports 138, is sealingly coupled to mounting element 122. It will be appreciated that blow-off sleeve 130 may, instead, be directly sealingly coupled to inner lockout sleeve 104 such that mounting element 122 may be eliminated.

An adjuster shaft 140 has a substantially hollow portion 141 having a flow passage 142 therethrough from which ports corresponding to, and in communication with, circulation ports 134, blow-off ports 136 and drain ports 138 radially extend. Preferably, o-rings 150 are provided to seal the connection between blow-off sleeve 130 and adjuster shaft 140. Adjuster shaft 140 is coupled (such as by a screw 152 or any other coupler) to actuator 114 comprising adjuster knob 154 on which adjuster pin 156 is mounted to select whether control unit 120 is in the "on" or "off" position, as will be described in further detail below. Actuator 114 is preferably located externally above inner tube 16, as shown in FIG. 1, to facilitate user access thereto during riding. A blow-off valve 160 is also provided comprising a blow-off piston 162 positioned within flow passage 142 of adjuster shaft 140 and biased in place by a biasing element 164, such as a coil spring, to block blow-off ports 136 when control unit 120 is in its "on" position. The function of blow-off valve 160 will be described in further detail below.

When control unit 120 is in the "off" position, adjuster shaft 140 is oriented in an "off" position such that ports therein (hidden in FIG. 8, which shows control unit 120 in its "off" position) are aligned with the circulation ports 134 in blow-off sleeve 130. Thus, fluid may be displaced from chamber 113 to flow passage 124, through circulation ports 134 in blow-off sleeve 130 between o-rings 150, and into chamber 115, so that shaft 106 and piston 112 can extend further into inner lockout sleeve 104 as inner tube 16 extends into outer tube 18 and fork 10 is compressed. The fluid moves through return ports 170 between lockout sleeves 102 and 104 above seal washer 172 (preferable formed from aluminum) and through return valve 174 comprised of axial ports 176 (preferably four ports are provided) through piston 112 and across rebound plate 178. Rebound plate 178 is preferably a one-way valve permitting flow only during rebound. Preferably, a flow control adjuster 180, such as a screw, is provided to hold rebound plate 178 in place.

Lockout device 100 permits the rider to adjust the suspension characteristics of fork 10 by turning lockout device 100 "on" by positioning actuator 114 in an "on" position. When adjuster pin 156 of actuator 114 is moved to the "on" position, adjuster shaft 140 is rotated from the "off" to the "on" position. This "off" to "on" movement preferably is less than 180° and most preferably is no more than about 60°. Once control unit 120 is "on," circulation ports 134 are substantially closed off. Thus, fluid flow from chamber 113 into chamber 115 is substantially prevented such that telescoping tubes 12, 14 are substantially prevented from compressing and fork 10 acts like a rigid fork.

In addition, when adjuster shaft 140 is in its "on" position, blow-off ports 136 in blow-off sleeve 130 may be opened up and flow permitted if sufficient force from an impact or other force input is imparted to the fork, such that biasing element 164 is compressed and blow-off piston 162 is moved out of its blocking relationship with blow-off ports 136. However, unless extreme riding conditions occur, such as when the fork is subjected to forces that would cause great discomfort or loss of control to the rider, flow through control unit 120 is substantially prevented such that compression of fork 10 is substantially prevented, i.e., springs 20, 21 and 54 will be completely bypassed, and fork 10 operates as a rigid member. Among other things, the locked condition of fork 10 prevents the oscillation of fork 10 and the absorption of pedal drive energy when the rider pedals out of the saddle Thus, hydraulic lockout device 100 enables a bike rider, with the turn of an actuation device, to make fork 10 rigid. It will be appreciated that, in addition to or as an alternative to substantially full lock-out, different degrees of compressibility and expandability of fork 10 may be achieved if desired by altering the degree to which the ports of adjuster shaft 140 are in communication with circulation ports 134 of blow-off sleeve 130.

As described, although fork 10 is kept rigid under normal impact conditions when lockout device 100 is "on," lockout device 100 provides a pressure relief system that functions upon harsh or sudden impacts to fork 10 to ensure that the fork will not fail, e.g., its seals will not be dislodged or damaged, when the bicycle encounters high force impacts. Thus, although the fork is substantially rigid because fluid flow between chambers 113 and 115 is substantially inhibited, compression of fork 10 is not completely prevented under extreme impact conditions. With adjuster shaft 140 in the "on" position, fluid will only escape from chamber 113 to chamber 115 formed between inner lockout sleeve 104 and outer lockout sleeve 102 by opening blow-off valve 160 by pushing blow-off piston 162 upwards and compressing blow-off piston spring 164 to uncover the blow-off ports). Thus, at some high compression force level (determined by the spring rate of spring 164), flow will be permitted past blow-off valve 160 and fork 10 will be able to be compressed, even though the fork will be hydraulically locked against lower impacts thereto.

In particular, blow-off valve 160 acts in conjunction with blow-off ports 136 as a pressure relief valve. The blow-off valve spring 164 may be exchanged with a spring having a higher spring rate (such that higher forces are required to effect blow-off) or a lower spring rate (such that lower forces are required to effect blow-off), and the relief pressure may thereby be adjusted.

One or more drain ports 138 are also provided through blow-off sleeve 130 and adjuster shaft 140, respectively. These ports 138 do not normally act as flow paths, but serve to drain any fluid that manages to move around blow-off piston 162. Otherwise, air or oil trapped behind blow-off piston 162 may restrict the movement and operation of the blow-off valve 160. Drain ports 138 preferably are open regardless of the position of the blow-off valve 160.

During normal rebound operation when lockout device 100 is "off," return valve 174 permits fluid to circulate through circulation ports 134 between seals 150, down through chamber 115 and return ports 170 in inner lockout sleeve 104, to pass through piston 112, to return to chamber 113 formed within inner lockout sleeve 104, thus completing a circuit from chamber 113 to chamber 115 back to chamber 113. The ability to permit rebound when lockout device 100 is "on" is an important feature, for if lockout device 160 is activated (in the "on" position) while the fork 10 is compressed, the fluid must be able to circulate during the expansion of fork 10 or fork 10 will remain in a compressed state until lockout device 100 is turned off. This compressed condition is known as "packing" the fork. Thus, the ability of fluid to circulate at least during rebound or extension of telescoping fork tubes 12, 14 enables the fork to be locked out at any stage of compression or expansion of the fork.

The entire lockout assembly 100 is referred to as a "spring stack" and, like the preload adjuster 40, lockout assembly 100 preferably may be drawn out of the top of inner tube 16 as a unit for easy servicing. As in the side of the fork having the preload adjuster 40 of the present invention, the preload of the coil compression spring 21 on the hydraulic lockout side of the fork 10 can also be adjusted. Preferably a plurality of load adjusters 182, preferably in the form of a plurality of shims, coupled by coupler 184, such as a screw, to shaft 106 are provided for such adjustment. As shown in FIG. 1, within fork 10, preload shims 182 are loosely placed onto plunger end plate 32. To adjust the preload of the compression spring 21, the entire assembly 100 is drawn out of the inner tube 16, and screw 184 is removed to remove or add shims 182. Removal of shims modifies the load on spring 21 in a manner corresponding to adjustments made to preload adjuster 40. If both shims are taken out, for example, approximately 3 mm of preload will be available, corresponding to level III of preload adjuster 40. In the preferred embodiment of FIGS. 1 and 8, three shims may be added or removed for three levels of preload, corresponding to the three levels of preload adjuster 40. However, as will be appreciated by those skilled in the art, the principles of the present invention may be employed such that any number of shims 182 may be added or removed. Preferably, coil spring 21 is capable of providing approximately 30 mm of travel and approximately 11 mm of preload.

In operation, when fork 10 is active and the lockout device 100 is in the "off" position, fork 10 can be compressed, and shaft 106, with piston 112 and valve 174, moves up into chamber 113 formed within inner lockout sleeve 104. In the preferred embodiment described herein, inner lockout sleeve 104, lockout device 100, and control unit 120, with lockout sleeve 102 attached to crown 186 of fork 10, remain stationary, as they are attached to the inner fork tube 16.

Adjuster knob 154 has a special adjustment feature so that it can only be screwed onto adjuster shaft 140 in the correct ("on" or "off") position. In addition, blow-off sleeve 130 has a detente so that blow-off sleeve 130 is biased (by a spring and ball against a lobe on the adjuster shaft) to either an "on" or an "off" position (3 o'clock or 5 o'clock position). This provides tactile feedback to the rider so that the rider can know when fork 10 is in the locked or unlocked position.

As will be clear those of ordinary skill in the art, although preload adjuster 40 and hydraulic lockout device 100 of the present invention are ideally suited for joint operation, a suspension bicycle fork or other suspension system may use one without the other. In addition, although these devices are disclosed as applied to the front fork of a bicycle, those skilled in the art will recognize that preload adjuster 40 and/or hydraulic lockout device 100 of the present invention may be used in a rear bicycle fork or swing-arm shock, head tube, seat tube, or in another suitable bicycle or other suspension assembly instead.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A preload adjuster for adjusting the preload of a suspension system in a bicycle suspension fork having a pair of legs, each leg having a pair of telescoping fork tubes, said preload adjuster comprising first and second interengaging preload elements having a combined length, each said preload element having a first end and a second end, wherein said second end of said first preload element and said first end of said second preload element are shaped to interengage each other in one of a plurality of relative positions such that the combined length of said preload elements is variable; wherein said first and second preload elements are aligned along a longitudinal axis when interengaged and are disengaged by being moved apart in a direction substantially perpendicular to said longitudinal axis.

2. A preload adjuster for adjusting the preload of a suspension system in a bicycle suspension fork having a pair of legs, each leg having a pair of telescoping fork tubes, said preload adjuster comprising first and second interengaging preload elements having a combined length, each said preload element having a first end and a second end, wherein said second end of said first preload element and said first end of said second preload element are shaped to interengage each other in one of a plurality of relative positions such that the combined length of said preload elements is variable; wherein said first and second preload elements are positioned between first and second biasing elements of said suspension system.

3. A preload adjuster as in claim 2, wherein said first end of said first element and said second end of second element are each shaped to engage a respective biasing element of said suspension system.

4. A preload adjuster as in claim 3, wherein:
said first end of said first element is shaped to engage said first biasing element;
said first biasing element is a coil spring;
said second end of said second element is shaped to engage said second biasing element; and
said second biasing element is an elastomer spring.

5. A preload adjuster for adjusting the preload of a suspension system in a bicycle suspension fork having a pair of legs, each leg having a pair of telescoping fork tubes, said preload adjuster comprising first and second interengaging preload elements having a combined length, each said preload element having a first end and a second end, wherein said second end of said first preload element and said first end of said second preload element are shaped to interengage each other in one of a plurality of relative positions such that the combined length of said preload elements is variable, wherein:

said suspension system is positioned within a leg of the suspension fork, the leg having a first end and a second end;

said suspension system includes a coil suspension spring positioned adjacent the first end of the suspension fork leg and an elastomer preload spring positioned adjacent the second end of the suspension fork leg;

said first preload element is a preloader;

said second preload element is a spacer;

said first end of said preloader is coupled to said coil suspension spring; and said second end of said spacer is coupled to said elastomer preload spring.

6. A method of adjusting the preload of a suspension system in a bicycle suspension fork having first and second telescoping fork tubes, said method comprising the steps of:

positioning a preload adjuster comprising first and second interengaging preload elements having a combined length within a leg of the bicycle suspension, fork each said preload element having a first end and a second end; and selectively interengaging said second end of said first preload element and said first end of said second preload element in one of a plurality of relative distinct positions to vary the combined length of said preload adjusters;

wherein said preload elements are aligned along a longitudinal axis when interengaged, said step of interengaging said first and second elements comprising the step of moving said first and second preload elements relative to each other in a direction substantially perpendicular to said longitudinal axis.

7. A lockout mechanism for a bicycle suspension fork having a pair of legs, each leg having first and second telescoping fork tubes, said fork undergoing compression when said fork tubes telescope together and expansion when said fork tubes telescope apart, said lockout mechanism selectively converting said bicycle suspension fork from an energy absorbing suspension system permitting compression of said fork to a relatively rigid system inhibiting compression of said fork, said lockout mechanism comprising:

first and second fluid chambers in fluid communication;

a fluid circulation control unit positioned between and controlling fluid flow between said first and second fluid chambers;

wherein:

said fluid circulation control unit is positionable between an off position in which fluid flows between said first and second chambers such that compression and rebound of said fork are permitted, and an on position in which fluid flow between said first and second chambers is inhibited such that compression of said fork is inhibited;

an outer lockout sleeve positioned within one of the fork tubes of the bicycle suspension fork; and an inner lockout sleeve substantially coaxially positioned within said outer lockout sleeve;

wherein:

said first fluid chamber is defined within said inner lockout sleeve;

said second fluid chamber is a substantially annular chamber defined between said inner and outer lockout sleeves;

at least one flow passage is defined between said outer and inner lockout sleeves to fluidly communicate said first and second fluid chambers; and said fluid control unit controls fluid flow through said flow passage.

8. A lockout mechanism as in claim 7, wherein said fluid circulation control unit comprises:

a blow-off sleeve mounted on said inner lockout sleeve and having at least one circulation port defined therethrough; and an adjuster shaft rotatably mounted within said blow-off sleeve and having at least one circulation port defined therethrough selectively alignable with said blow-off sleeve circulation port upon rotation of said adjuster shaft relative to said blow-off sleeve;

wherein alignment of said circulation ports of said blow-off sleeve and said adjuster shaft define said flow passage between said first and second fluid chambers permitting fluid communication therebetween.

9. A lockout mechanism as in claim 8, wherein:

said fluid circulation control unit further comprises an actuator coupled to said adjuster shaft;

said actuator extends outside said fork tubes for user accessibility during riding; and said actuator is selectively positionable between an off position in which said circulation ports of said blow-off sleeve and said adjuster shaft are aligned and an on position in which said circulation ports of said blow-off sleeve and said adjuster shaft are out of alignment such that fluid communication between said first and second fluid chambers through said circulation ports is blocked.

10. A lockout mechanism as in claim 9, wherein said actuator is rotated less than 180° between said off position and said on position.

11. A lockout mechanism as in claim 10, wherein said actuator is rotated no more than about 60° between said off position and said on position.

12. A lockout mechanism as in claim 8, wherein:

at least one blow-off port is defined in said blow-off sleeve;

at least one blow-off port is defined in said adjuster shaft circumferentially spaced from said circulation port;

a blow-off valve is positioned within said adjuster shaft and axially movable between a position blocking said adjuster shaft blow-off port and a position uncovering said adjuster shaft blow-off port; and when said fluid circulation control unit is in said on position said circulation ports of said blow-off sleeve and said adjuster shaft are out of alignment, said blow-off ports of said blow-off sleeve and said adjuster shaft are aligned, and said blow-off valve is movable into said position uncovering said blow-off port in said adjuster shaft to permit limited flow between said first and second chambers.

13. A lockout mechanism as in claim 7, further comprising:
- a piston shaft having a first end and a second end, said first end of said piston shaft extending within and slidably movable with respect to said lockout sleeves such that a portion of said piston shaft extends outside said lockout sleeves;
- a piston mounted on said first end of said piston shaft and slidably movable within said inner lockout sleeve; and
- a coil spring positioned about said portion of said piston shaft extending outside said lockout sleeves and having a first end abutting at least said outer lockout sleeve and a second end mounted adjacent said second end of said piston shaft.

14. A lockout mechanism as in claim 13, further comprising a plurality of load adjusters positioned between said second end of said coil spring and said second end of said piston shaft, the number of load adjusters provided varying the preload of said coil spring.

15. A lockout mechanism as in claim 7, further comprising:
- a piston shaft having a first end and a second end, said first end of said piston shaft extending within and slidably movable with respect to said lockout sleeves such that a portion of said piston shaft extends outside said lockout sleeves;
- a piston mounted on said first end of said piston shaft and slidably movable within said inner lockout sleeve; and
- a valve defined through said piston permitting fluid flow from said second fluid chamber to said first fluid chamber even when said fluid circulation control unit is in said on position.

16. A lockout mechanism for a bicycle suspension fork having a pair of legs, each leg having first and second telescoping fork tubes, said fork undergoing compression when said fork tubes telescope together and expansion when said fork tubes telescope apart, said lockout mechanism selectively converting said bicycle suspension fork from an energy absorbing suspension system permitting compression of said fork to a relatively rigid system inhibiting compression of said fork, said lockout mechanism comprising:
- first and second fluid chambers in fluid communication;
- a fluid circulation control unit positioned between and controlling fluid flow between said first and second fluid chambers;
- wherein:
  - said fluid circulation control unit is positionable between an off position in which fluid flows between said first and second chambers such that compression and rebound of said fork are permitted, and an on position in which fluid flow between said first and second chambers is inhibited such that compression of said fork is inhibited; and
- a blow-off valve positioned between said first and second fluid chambers and permitting limited fluid flow from said first fluid chamber to said second fluid chamber even when said fluid circulation control unit is in said on position.

17. A method of adjusting the compressibility of a bicycle suspension fork having a pair of telescoping fork tubes, said fork undergoing compression when said fork tubes telescope together and expansion when said fork tubes telescope apart, such that the suspension fork is adjusted from being compressible to being substantially rigid and capable of undergoing substantially no compression, said method comprising the steps of:
- providing at least one fork tube with first and second fluid chambers in fluid communication;
- providing a fluid circulation control unit between said first and second fluid chambers, said fluid circulation control unit being positionable between an off position in which fluid flows between said first and second chambers such that compression and rebound of said fork are permitted, and an on position in which fluid flow between said first and second chambers is inhibited such that compression of said fork is substantially inhibited; and
- adjusting said fluid circulation control unit to modify the degree to which said first and second fluid chambers are in fluid communication, thereby adjusting the compressibility of said suspension fork.

18. A method as in claim 17, further comprising the step of providing an actuator coupled to said fluid circulation control unit and extending outside said fork tube for user accessibility during riding of the bicycle.

19. A method as in claim 17, wherein:
- said step of providing at least one fork tube with first and second fluid chambers further comprises the step of providing an outer lockout sleeve within said at least one fork tube and an inner lockout sleeve substantially coaxially within said outer lockout sleeve;
- said step of providing a fluid circulation control unit further comprises the step of mounting a blow-off sleeve on said inner lockout sleeve and an adjuster shaft within said blow-off sleeve, each of said blow-off sleeve and said adjuster shaft having at least one circulation port, said circulation ports being alignable upon rotation of said adjuster shaft relative to said blow-off sleeve; and
- said step of adjusting said fluid circulation control unit further comprises the step of rotating said adjuster shaft to selectively place said blow-off sleeve and adjuster shaft circulation ports into and out of alignment.

20. A method as in claim 19, wherein at least one blow-off port is defined in each of said blow-off sleeve and said adjuster shaft, said method further comprising the steps of:
- positioning a blow-off valve within said adjuster shaft for axial movement therein between a position blocking said adjuster shaft blow-off port and a position uncovering said adjuster shaft blow-off port; and
- rotating said adjuster shaft into a position in which said circulation ports of said blow-off sleeve and said adjuster shaft are out of alignment and said blow-off ports of said blow-off sleeve and said adjuster shaft are aligned such that upon harsh impacts to the suspension fork, said blow-off valve is moved into said position uncovering said blow-off ports to permit limited flow between said first and second chambers.

21. A method as in claim 19, further comprising the steps of:
- providing a piston shaft having a first end and a second end;
- extending said first end of said piston shaft through said inner lockout sleeve such that a portion of said piston shaft extends outside said outer lockout sleeve; and
- mounting a coil spring about said portion of said piston shaft extending outside said outer lockout sleeve, said coil spring having a first end abutting said outer lockout sleeve and a second end mounted adjacent said second end of said piston shaft.

22. A method as in claim 21, further comprising the steps of:
  providing a plurality of load adjusters between said second end of said coil spring and said second end of said piston shaft; and
  varying the number of load adjusters provided to vary the preload of said coil spring.

23. A bicycle suspension fork comprising:
  first and second fork legs, each fork leg having a pair of telescoping fork tubes, said fork undergoing compression when said fork tubes telescope together and expansion when said fork tubes telescope apart;
  a suspension biasing element in at least said first fork leg;
  a preload adjuster within said first fork leg adjacent said suspension biasing element, said preload adjuster comprising first and second interengaging preload elements having a combined length, each said preload element having a first end and a second end, said second end of said first preload element and said first end of said second preload element being shaped to interengage each other in one of a plurality of relative positions such that the combined length of said preload elements is variable; and
  a lockout mechanism within said second fork leg, said lockout mechanism comprising first and second fluid chambers in fluid communication, and a fluid circulation control unit positioned between and controlling fluid flow between said first and second fluid chambers;
  wherein:
  adjustment of the position of said first and second preload elements relative to each other modifies the preload on said suspension biasing element; and
  said fluid circulation control unit of said lockout mechanism is positionable between an off position in which fluid flows between said first and second chambers such that compression and rebound of said fork are permitted, and an on position in which fluid flow between said first and second chambers is inhibited such that compression of said fork is inhibited.

24. A bicycle suspension fork as in claim 23, wherein said preload adjuster is sufficiently narrow and lightweight for use in a road bicycle.

25. A bicycle suspension fork as in claim 23, wherein said second end of said first preload element and said first end of said second preload element are provided with corresponding interengaging ribs and grooves.

26. A bicycle suspension fork as in claim 23, wherein said first and second preload elements are aligned along a longitudinal axis when interengaged and are disengaged by being moved apart in a direction substantially perpendicular to said longitudinal axis.

27. A bicycle suspension fork as in claim 23, wherein said lockout mechanism further comprises:
  an outer lockout sleeve positioned within one of said fork tubes; and
  an inner lockout sleeve substantially coaxially positioned within said outer lockout sleeve;
  wherein:
  said first fluid chamber is defined within said inner lockout sleeve;
  said second fluid chamber is a substantially annular chamber defined between said inner and outer lockout sleeves;
  at least one flow passage is defined between said outer and inner lockout sleeves to fluidly communicate said first and second fluid chambers; and
  said fluid control unit controls fluid flow through said flow passage.

28. A bicycle suspension fork as in claim 27, wherein said fluid circulation control unit comprises:
  a blow-off sleeve mounted on said inner lockout sleeve and having at least one circulation port defined therethrough; and
  an adjuster shaft rotatably mounted within said blow-off sleeve and having at least one circulation port defined therethrough selectively alignable with said blow-off sleeve circulation port upon rotation of said adjuster shaft relative to said blow-off sleeve;
  wherein alignment of said circulation ports of said blow-off sleeve and said adjuster shaft define said flow passage between said first and second fluid chambers permitting fluid communication therebetween.

29. A bicycle suspension fork as in claim 28, wherein:
  said fluid circulation control unit further comprises an actuator coupled to said adjuster shaft;
  said actuator extends outside said fork tubes for user accessibility during riding; and
  said actuator is selectively rotatable between an off position in which said circulation ports of said blow-off sleeve and said adjuster shaft are aligned and an on position in which said circulation ports of said blow-off sleeve and said adjuster shaft are out of alignment such that fluid communication between said first and second fluid chambers through said circulation ports is blocked.

30. A bicycle suspension fork as in claim 29, wherein:
  at least one blow-off port is defined in said blow-off sleeve;
  at least one blow-off port is defined in said adjuster shaft circumferentially spaced from said circulation port;
  a blow-off valve is positioned within said adjuster shaft and axially movable between a position blocking said adjuster shaft blow-off port and a position uncovering said adjuster shaft blow-off port; and
  when said fluid circulation control unit is in said on position said circulation ports of said blow-off sleeve and said adjuster shaft are out of alignment, said blow-off ports of said blow-off sleeve and said adjuster shaft are aligned, and said blow-off valve is movable into said position uncovering said blow-off port in said adjuster shaft to permit limited flow between said first and second chambers.

31. A bicycle suspension fork as in claim 27, further comprising:
  a piston shaft having a first end and a second end, said first end of said piston shaft extending within and slidably movable with respect to said lockout sleeves such that a portion of said piston shaft extends outside said lockout sleeves;
  a piston mounted on said first end of said piston shaft and slidably movable within said inner lockout sleeve; and
  a coil spring positioned about said portion of said piston shaft extending outside said lockout sleeves and having a first end abutting at least said outer lockout sleeve and a second end mounted adjacent said second end of said piston shaft.

32. A bicycle suspension fork as in claim 31, further comprising a plurality of load adjusters positioned between said second end of said coil spring and said second end of said piston shaft, the number of load adjusters provided varying the preload of said coil spring.

33. A bicycle suspension fork as in claim 32, wherein said load adjusters and said preload elements are adjustable in the same increments such that preload in both said fork legs is the same.

34. A bicycle suspension fork as in claim 27, further comprising:

a piston shaft having a first end and a second end, said first end of said piston shaft extending within and slidably movable with respect to said lockout sleeves such that a portion of said piston shaft extends outside said lockout sleeves;

a piston mounted on said first end of said piston shaft and slidably movable within said inner lockout sleeve; and a valve defined through said piston permitting fluid flow from said second fluid chamber to said first fluid chamber even when said fluid circulation control unit is in said on position.

35. A bicycle suspension fork as in claim 24, further comprising a blow-off valve positioned between said first and second fluid chambers of said lockout mechanism, said blow-off valve permitting limited fluid flow from said first fluid chamber to said second fluid chamber even when said fluid circulation control unit is in said on position.

* * * * *